United States Patent [19]
Matsuda et al.

[11] Patent Number: 5,396,483
[45] Date of Patent: Mar. 7, 1995

[54] RECORDING MEDIUM HAVING A TRACK AND ELECTRODE LAYER PROVIDED AND RECORDING AND REPRODUCING DEVICE AND SYSTEM USING SAME

[75] Inventors: Hiroshi Matsuda, Isehara; Hisaaki Kawade, Atsugi; Yuko Morikawa, Kawasaki, all of Japan

[73] Assignee: Canon Kabushiki Kaisha, Tokyo, Japan

[21] Appl. No.: 978,023

[22] Filed: Nov. 18, 1992

Related U.S. Application Data

[63] Continuation of Ser. No. 564,563, Aug. 9, 1990, abandoned.

[30] Foreign Application Priority Data

Aug. 10, 1989 [JP] Japan .................................. 1-205767
Jul. 25, 1990 [JP] Japan .................................. 2-194977

[51] Int. Cl.$^6$ .......................... G11B 3/70; G11B 5/84; G11B 7/26; G11B 9/00
[52] U.S. Cl. ................................ 369/283; 369/277; 369/126
[58] Field of Search ................. 369/59, 100, 109, 126, 369/277, 283; 365/118, 151; 250/306; 427/43.1

[56] References Cited

U.S. PATENT DOCUMENTS

| | | | |
|---|---|---|---|
| 4,018,937 | 4/1977 | Levine et al. | 427/43.1 |
| 4,133,047 | 1/1979 | Levinthal | 365/118 |
| 4,343,993 | 8/1982 | Binnig et al. | 250/306 |
| 4,760,567 | 7/1988 | Crewe | 369/101 |
| 4,876,042 | 10/1989 | Imataki et al. | 264/39 |
| 4,945,515 | 7/1990 | Doumi et al. | 369/126 X |
| 4,956,214 | 9/1990 | Imataki et al. | 428/64 |
| 4,962,480 | 10/1990 | Ooumi et al. | 365/151 |
| 4,965,153 | 10/1990 | Imataki et al. | 430/11 |
| 4,972,402 | 11/1990 | Miura et al. | 369/275.1 |
| 4,975,310 | 12/1990 | Nagano | 428/64 |

FOREIGN PATENT DOCUMENTS

| | | |
|---|---|---|
| 0171068 | 2/1986 | European Pat. Off. . |
| 0174860 | 3/1986 | European Pat. Off. . |
| 0227395 | 7/1987 | European Pat. Off. . |
| 0272935 | 6/1988 | European Pat. Off. . |
| 0334677 | 9/1989 | European Pat. Off. . |
| 0360337 | 3/1990 | European Pat. Off. . |
| 161552 | 7/1988 | Japan . |
| 161553 | 7/1988 | Japan . |
| 204531 | 8/1988 | Japan . |
| 2182480 | 5/1987 | United Kingdom . |

OTHER PUBLICATIONS

"The Scanning Tunneling Microscope" by Binnig and Rohrer Scientific American Aug. 1985.
"High Stability Bimorph Scanning Tunneling Microscope" by Blackford et al. Rev. Sci. Instrum vol. 58, No. 8, Aug. 1987.
Surface Modification with the Scanning Tunneling Microscope by Abraham et al. IBM J. Res Develop vol. 30 No. 5 Sep. 1986.
Surface Modification in the Nanometer Range by the Scanning Tunneling Microscope by Staver et al. J. Vac. Sci. Technol. A6 Mar./Apr. 1988.
Hlevetica Physica Acta. vol. 55 (1982) 726:735.

*Primary Examiner*—Joseph L. Divon
*Assistant Examiner*—James Peikari
*Attorney, Agent, or Firm*—Fitzpatrick, Cella, Harper & Scinto

[57] ABSTRACT

A recording medium is prepared by irradiating an electron beam on a substrate following a certain pattern, then vapor depositing a metal onto the substrate to form a track comprising ultra-fine particles of the metal, further providing a metal layer on the substrate, and providing a recording layer on the metal layer. Recording is effected on a track having a preferable width of 40 Å to 400 Å formed on the recording surface of the medium by applying a pulse voltage or current between the medium and a probe arranged approximate thereto.

28 Claims, 5 Drawing Sheets

RECORDING MEDIUM HAVING A TRACK AND ELECTRODE LAYER PROVIDED AND RECORDING AND REPRODUCING DEVICE AND SYSTEM USING SAME

This application is a continuation of application Ser. No. 07/564,563, filed Aug. 9, 1990, now abandoned.

BACKGROUND OF THE INVENTION

1. Field of the Invention

This invention relates to a recording medium and a substrate for a recording medium to be used in a recording and reproducing device which performs recording and reproduction by use of a scanning probe, wherein reproducibility of recording and reproduction of information is improved. The invention also relates to a method for preparation of the recording medium.

Also, the present invention relates to a recording, reproducing and erasing method and a recording and reproducing device which performs recording and reproduction with good reproducibility by use of such a recording medium.

2. Related Background Art

In recent years, the use of memory materials has formed the nucleus of electronics industries, such as computers and their related instruments, video discs, digital audio discs, etc., and development of those materials also has been under active progress. The performance characteristics demanded for memory materials may differ depending on uses, but may generally include:

(1) high density and large recording capacity;
(2) rapid response speed of recording and reproduction;
(3) small power consumption; and
(4) high productivity and low cost; etc.

Heretofore, semiconductor memories or magnetic memories employing magnetic material or semiconductor material as the base material have been predominant, but with the advancement of laser technique, inexpensive and high density recording media with optical memory using an organic thin film such as an organic dye, photopolymer, etc. are now emerging in the field of art.

On the other hand, recently, a scanning type tunnel microscope (hereinafter abbreviated as STM) capable of observing directly the electron structure of the surface atoms of a conductor has been developed [G. Binnig et al, Helvetica Physica Acta, 55, 726 (1982)], and it has become possible to measure both single crystalline and amorphous materials with high resolving power of real space image. In addition, this method has the advantage that observation can be made at low power without caused damage by current to the medium. Further, it can be operated in an air environment and applied to various materials, and therefore a broad scope of applications are expected.

STM is based on the phenomenon that tunnel current flows when a probe and an electroconductive substance approach each other at a distance of about 1 nm with a voltage applied therebetween. This current is very sensitive to the distance change between them, and by scanning the probe so that the tunnel current is maintained constant, the surface structure of the real space can be drawn and at the same time a variety of information about the total electron cloud of surface atoms can be read.

In this case, resolving power in the interplanar direction is about 1 Å. Therefore, by applying the principles of STM, it is possible to perform high density recording and reproduction sufficiently in the order of an interatomic distance (several Å). As a recording and reproducing method in this case, there has been proposed a method in which recording is performed by changing the surface state of an appropriate recording layer by use of a particle ray (electron beam, ion beam) or a high energy electromagnetic wave such as an X-ray or an energy ray such as visible light or UV-ray, etc., and reproduction is effected by STM, and a method in which a material having a memory effect for switching characteristics of voltage and current, for example, a $\pi$-electron type organic compound or a chalcogenide thin film, is used as the recording layer, and recording and reproduction are performed by use of STM, etc. (Japanese Patent Laid-Open No. 63-204531, No. 63-161552, No. 63-161553).

Also, in recent years, based on such STM technique as mentioned above, there has been invented a method for measuring various mutual interactions between a probe and a test sample. Also by utilizing such a scanning probe, high density recording and reproduction can be performed. For example, by use of an intramolecular force microscope (hereinafter abbreviated as AFM) which measures the intramolecular force acting between a probe and a test sample, even if the recording medium is completely insulated, its surface shape can be detected on an atomic order.

In such a recording and reproducing method as described above, in order to practically record and reproduce a large amount of information, it becomes necessary to perform positional detection and correction control (tracking) of a probe in the XY direction (interplanar direction of recording medium).

SUMMARY OF THE INVENTION

Accordingly, an object of the present invention is to provide a recording medium and a substrate therefor which can practice recording and reproduction of a large amount of information easily and with good reproducibility in a high density recording and reproducing method using a scanning probe, and a method for preparing the same.

It is another object of the present invention to provide a recording and reproducing device and a recording, reproducing and erasing method which can perform high density recording and reproduce a large amount of information with good reproducibility.

The above objects can be accomplished according to the present invention as specified below.

That is, the present invention provides a substrate for a recording medium having a track with a width in the range of from 40 Å to 400 Å.

The present invention also provides a method for preparing a substrate for a recording medium, which comprises the steps of irradiating a substrate with an electron beam in accordance with a certain pattern, and forming a track comprising ultra-fine particles of a metal by vapor depositing the metal onto the substrate.

The present invention also provides a method for preparing an electrode substrate, which comprises the steps of irradiating a substrate with an electron beam in accordance with a certain pattern, forming a track comprising ultra-fine particles of a metal by vapor depositing the metal onto the substrate, and providing a metal layer on the substrate.

The present invention also provides a recording medium having a track with a width in the range of from 40 Å to 400 Å on a recording surface.

The present invention also provides a method for preparing a recording medium, which comprises the steps of irradiating a substrate with an electron beam in accordance with a certain pattern, forming a track comprising ultra-fine particles of a metal by vapor depositing the metal onto the substrate, providing a metal layer on the substrate, and providing a recording layer on the metal layer.

The present invention also provides a recording method which comprises the steps of accessing a probe to a recording medium having a track on a recording surface, and performing recording through the probe electrode on the track.

The present invention also provides a recording and reproducing method, which comprises the steps of performing recording on a track by accessing a probe to a recording medium having the track on a recording surface and applying a pulse voltage between a substrate electrode and a probe electrode, and reproducing the recorded information by applying a bias voltage between the substrate electrode and the probe electrode.

The present invention also provides a recording, reproducing and erasing method, which comprises the steps of performing recording on a track by accessing a probe to a recording medium having the track on a recording surface and applying a pulse voltage between a substrate electrode and a probe electrode, reproducing the recorded information by applying a bias voltage between the substrate electrode and the probe electrode, and further erasing the recorded information by applying a pulse voltage between the probe electrode and the substrate electrode.

The present invention also provides a recording device comprising a recording medium having a track with a width in the range of from 40 Å to 400 Å on a recording surface, an electroconductive probe arranged approximate to said recording medium and a pulse voltage application circuit for recording.

The present invention also provides a reproducing device, comprising a recording medium having a track with a width in the range of from 40 Å to 400 Å on a recording surface having information recorded on the track, an electroconductive probe arranged approximate to said recording medium and a bias voltage application circuit for reproduction.

The present invention also provides a recording and reproducing device comprising a recording medium having a track with a width in the range of from 40 Å to 400 Å on a recording surface, an electroconductive probe arranged approximate to said recording medium, a pulse voltage application circuit for recording and erasing and a bias voltage application circuit for reproduction.

DESCRIPTION OF THE PREFERRED EMBODIMENTS

Figure 1A:
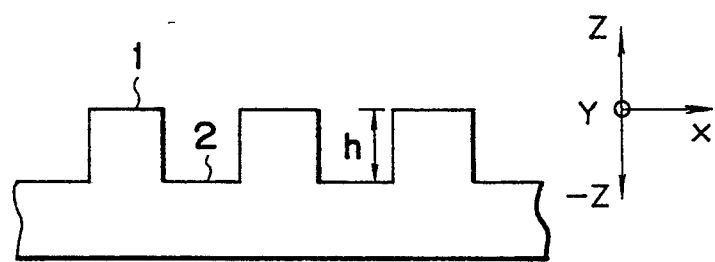
FIG. 1A and FIG. 1B are schematic views showing the shape of the recording medium to be used in the present invention.
Figure 1B:
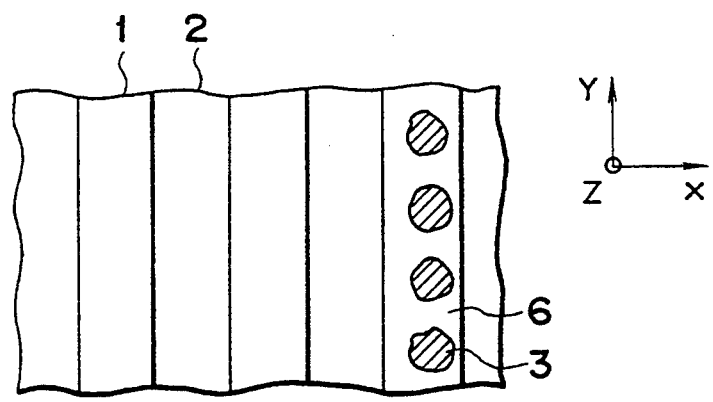

The recording and reproducing method by use of the recording medium of the present invention and the tracking method therefor utilize, for example, the phenomenon that tunnel current flows when the distance between a probe electrode (electroconductive probe) and an electroconductive material approaches to about 1 nm while applying a voltage between them. In the following, description is made about the method of tracking when a probe electrode is employed. FIGS. 1A and 1B are schematic sectional and plan views, respectively, illustrating the shape of the recording medium to be used in the present invention. In FIGS. 1A and 1B, respective recording surfaces, namely a row of recording bits are formed on the track 1. Accordingly, for recording and reproduction of information, a probe electrode is required to be scanned in the Y direction in FIGS. 1A and 1B. When the probe electrode is scanned so that the tunnel current between the probe electrode and the track surface is constant (constant current mode), if the probe electrode deviates from the track surface to the non-recording surface 2, then the probe electrode will move greatly in the -Z direction to maintain the tunnel current constant. When the displacement amount in the -Z direction is likely to exceed a certain set value, the probe electrode can be moved in the X or X' direction due to provision of a correction circuit, whereby the probe electrode can be scanned without deviating from the track 1. Now, when the track height is defined as h, the following relationship is valid with the -Z direction displacement tolerance value $h'$ of such probe electrode: $h > h'$. While the method of performing recording on the track is described later, according to the recording information, the charge state or the shape in the respective recording bits 3 on the track 1 will change. Therefore, after recording, if the probe electrode is moved in the constant current mode over the entire track surface, a tracking error can possibly occur. For prevention of this error, the position of the probe electrode is controlled (tracking) so that the distance between the probe electrode and the track 1 surface may be kept constant by forming non-recording intervals at a constant period on the track 1 and scanning the probe electrode in the constant current mode at the above non-recording intervals, and recording and reproduction may be performed in the respective recording bits while maintaining the distance between the probe electrode and the track 1 surface determined by the above operation. In other words, recording bits 3 are formed periodically on the track 1 and tracking of the probe electrode is performed by use of the marginal portion (tracking site 6) between the recording bits. In FIGS. 1A and 1B, the vertical positional relationship between the track 1 and the non-recording surface 2 may be reversed without any problem. In such case, the row of recording bits are formed on the concave portion. However, in this constitution, if the probe electrode deviates from the concave track during probe electrode scanning, then the probe electrode may collide against the side wall of the non-recording surface, whereby there is a fear that the probe electrode or the track may be destroyed. Therefore, it is desirable to use a convex track as shown in FIG. 1. Further, recording bits may be also provided on both the track 1 and the non-recording surface 2 of FIG. 1 as a matter of course. However, also in this case, it is relatively difficult to scan the probe electrode along the concave portion.

Figure 2:
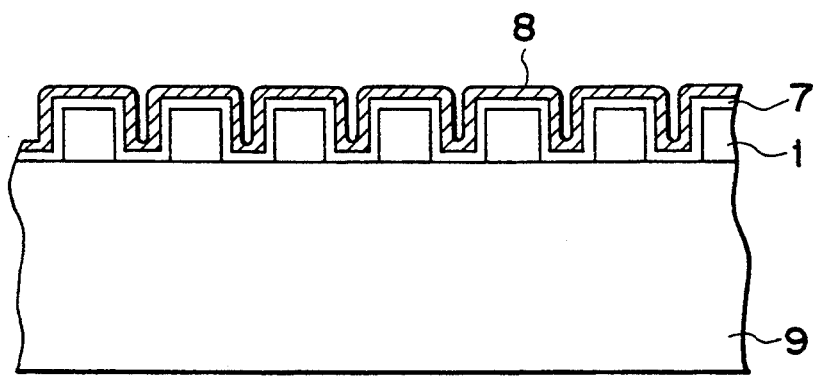
FIG. 2 is a constitutional diagram of the recording medium.

Next, FIG. 2 shows a constitutional view of the recording medium to be used in the present invention. As the substrate 9, any material may be used, provided that the surface is smooth, but utilizable substrate materials are somewhat restricted depending on the method of forming the track 1 as described below.

Figure 3A:
FIG. 3A, FIG. 3B, FIG. 3C, FIG. 3D and FIG. 3E are diagrams of the steps for forming the electrode substrate and the recording medium.
Figure 3B:
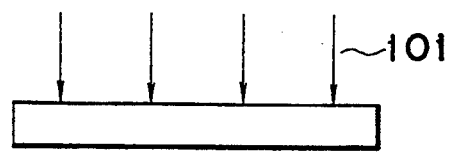
Figure 3C:
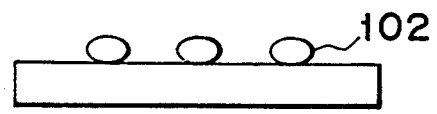

As the method for forming the track 1, there may be employed (1) the method of using lithographic technique, and (2) the method of using selective vapor deposition of ultra-fine particles, etc. In the former method, the case of forming the track with a resist material, the case of preparing the track by selective etching of the substrate 9, the case of forming the substrate electrode 7 into an uneven shape by selective etching or lift-off to form the track, etc. may be conceivable, but in any case, it is difficult by the lithographic technique under the present situation to form a track having a width of 0.1 μm or less, and the limit of recording density is about $10^8$ to $10^{10}$ bits/cm$^2$. In contrast, by use of the latter method, a recording density of $10^{11}$ bits/cm$^2$ or higher can be attained easily. This method forms the track by utilizing the property of a certain kind of substance that, when such substance is vapor deposited in an extremely minute amount on a substrate, such vapor deposited substance will exhibit selective growth reflecting the micro-structure of the substrate surface. More specifically, when a metal such as gold, silver, chromium, cobalt, etc. is vacuum deposited after irradiation of electron beam 101 on a silicon substrate 9 as shown in FIGS. 3A and 3B, the existence probability of the vapor deposited substance 102 becomes very small on the track where the electron beam is irradiated (FIG. 3C). At this time, the beam diameter of the electron beam to be irradiated may be 50 Å or less, and when a track with a wide width is to be prepared, irradiation scanning will be repeated plural times while deviating little by little the electron beam. The preferred width of the track 40 Å to 400 Å, and more preferably 40 Å to 200 Å. The height of the track, namely the film thickness of the vapor deposited product 102, may be about 25 Å to 1000 Å, preferably 30 Å to 100 Å, and more preferably 30 Å to 80 Å. Even if the tracks may be mutually connected to each other, namely vapor deposited product 102 may be deposited also on the electron beam irradiated portion, there is no particular problem, provided that the density difference is distinct, i.e. the height being well defined. On the other hand, if all the tracks are electrically completely connected to one another, formation of the substrate electrode 7 can be omitted.

As the substrate 9, it is a required characteristic to involve no problem of charging accompanying electron beam irradiation 101, and utilization of silicon wafer, etc. is preferable. Also, as the vapor deposited substance, a metal such as gold, silver, chromium, cobalt, platinum, etc. can be utilized, and since the track width is as small as 40 Å to 400 Å, it is desirable to vapor-deposit ultra-fine particles 102 of these metals.

Figure 3D:

On the track 1 thus formed, the substrate electrode 7 is formed (FIG. 3D). As the metal constituting the substrate electrode 7, in addition to gold, silver, copper, aluminum, platinum, etc., alloys such as Au—Pd, etc. also can be utilized. Regardless of which material is employed, care should be taken so that the groove of the track may not be embedded during formation of the substrate electrode 7, and its surface should be preferably smooth, and it should be desirably formed by the sputtering method, etc. The substrate electrode 7 should preferably have a film thickness of 100 Å to 300 Å.

Figure 3E:
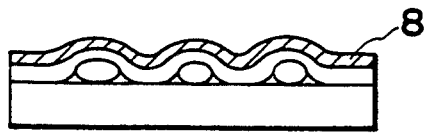

Next, a recording layer 8 is formed on the substrate electrode 7 (FIG. 3E). As such a recording layer 8, materials having the memory-switching phenomenon (electrical memory effect) in current-voltage characteristics can be utilized.

That is, the recording layer has at least two clearly different resistance states, and such states are freely transitionable to each other by application of a voltage or current of the threshold value or higher (switching phenomenon), and also the respective resistance states created can maintain their states in the case of application of a voltage or current within the threshold value (memory phenomenon).

For example, there may be included (1) amorphous semiconductors such as oxide glass, borate glass or chalcogenide glass containing Se, Te, as compounded with the element of the group III, IV, V or VI of the periodic table, etc. These are intrinsic semiconductors having an optical band gap Eg of 0.6 to 1.4 eV or an electrical activation energy ΔE of approximately 0.7 to 1.6 eV. Specific examples of chalcogenide glass may include A-Se—Te type, Ge—As—Se type, Si—Ge—As—Te type, for example, $Si_{16}Ge_{14}As_5Te_{65}$ (the subscripts show atomic %), or Ge—Te-X type, Si—Te-X type (X represents small amount of group V, and VI elements), for example $Ge_{15}Te_{81}Sb_2S_2$. Further, a chalcogenide glass of Ge—Sb—Se type also may be used.

In the amorphous semiconductor layer comprising the above compound deposited on the electrode, by applying a voltage in the direction vertical to the film surface by use of a probe electrode, the electric memory effect of the medium can be exhibited.

As the method for depositing such material, the object of the present invention can be sufficiently accomplished according to thin-film-forming techniques known in the art. For example, suitable film-forming methods may include the vacuum vapor deposition method, the cluster ion beam method, etc. Generally speaking, the electric memory effect of such material is observed at a film thickness of several μm or less, and concerning recording resolving power as the recording medium, the thickness may be preferably thinner. However, with respect to uniformity and recording characteristic, the film thickness is preferably 100 Å to 1 μm, and more preferably a thickness of 1000 Å or less.

Further, there may be included (2) organic semiconductor layers deposited as a salt of an electron accepting compound such as tetraquinodimethane (TCNQ), TCNQ derivatives, for example, tetrafluorotetracyanoquinodimethane (TCNQF$_4$), tetracyanoethylene (TCNE) and tetracyanonaphthoquinodimethane (TNAP), etc. with a metal having a relatively lower reduction potential such as copper or silver on the electrode.

As the method for forming such an organic semiconductor layer, there may be employed a method in which the above electron accepting compound is vacuum vapor deposited on an electrode made of copper or silver.

The electric memory effect of such an organic semiconductor is observed at a film thickness of several ten μm or less, but a film thickness of 100 Å to 1 μm is preferred with respect to the film forming property and uniformity.

Further, there may be employed (3) recording medium using amorphous silicon (a-Si) as the material. For example, a recording medium may have a layer constitution of metal/a-Si (p+ layer/n layer/i layer) or metal-/a-Si (n+ layer/p layer/i layer), and the respective layers of a-Si can be deposited satisfactorily according to the methods known in the art. In the present invention, the glow discharge method (GD) may be preferably employed. The film thickness of a-Si may be preferably 2000 Å to 8000 Å for the n layer, about 1000 Å for the p+ layer, with the total film thickness being preferably about 0.5 μm to 1 μm.

Further, there can be employed (4) a recording layer with a molecule having a group having a π-electron level and a group having a only σ-electron level laminated in combination on the electrode layer.

As the structure of the dye having a π-electron system suitable for the present invention, there may be included, for example, dyes having a porphyrine skeleton such as phthalocyanine, tetraphenylporphyrine, etc.; azulene type dyes having a squarylium group and croconic methine group as the bonding chain and cyanine-like dyes having two or more nitrogen-containing heterocyclic rings such as quinoline, benzothiazole, benzoxazole, etc. bonded through a squarylium group and croconic methine group; or cyanine dyes, condensed polycyclic aromatic compounds such as anthracene and pyrene, and chain compounds obtained by polymerization of an aromatic ring and heterocyclic compounds; and polymers of an diacetylene group; further derivatives of tetraquinodimethane or tetrathiafluvalene and analogues thereof and charge transfer complexes thereof; and further metal complex compounds such as ferrocene, tris-bipyridine ruthenium complexes, polyimide derivatives, polyamic acid derivatives, polyamide derivatives, various fumaric acid copolymers, various maleic acid copolymers, polyacrylic acid derivatives, various acrylic acid copolymers, polydiacetylene derivatives, various vinyl compounds, synthetic polypeptides, biological high molecular weight compounds such as bacteriorhodopsin, cytochrome C, etc.

Concerning formation of an organic recording layer, although the vapor deposition method or the cluster ion beam method may be applicable, an LB method is extremely suitable among the known techniques because of controllability, ease of use and reproducibility.

According to the LB method, a monolayer of an organic compound having a hydrophobic site and a hydrophilic site in one molecule or a built-up film thereof can be formed easily on a substrate, which has a thickness on the molecular order and a uniform and homogeneous organic ultra-thin film can be supplied stably over a large area.

The LB method is a method in which a monolayer or its built-up film is prepared by utilizing the phenomenon that, in a molecule with a structure having a hydrophilic site and a hydrophobic site in a molecule, when the balance of both (amphiphilic balance) is brought to a proper value, the molecule will form a monolayer on the water surface with the hydrophilic group directed downward.

Examples of the group constituting the hydrophobic site may include various hydrophobic groups generally known widely such as saturated and unsaturated hydrocarbon groups, condensed polycyclic aromatic groups and chain polycyclic phenyl groups, etc. These may constitute the hydrophobic moiety each individually or as a combination of a plurality thereof. On the other hand, most representative as the constituent of the hydrophilic moiety are, for example, hydrophilic groups such as a carboxyl group, ester group, acid amide group, imide group, hydroxyl group, further amino groups (primary, secondary, tertiary, and quaternary), etc. These also constitute the hydrophilic moiety of the above molecule each individually or as a combination of a plurality thereof.

Organic compounds having these hydrophobic groups and hydrophilic groups in combination with good balance and having a π-electron system having an adequate size can form a monolayer film on the water surface and can be extremely suitable materials for the present invention. Also, among the compounds mentioned above, it is particularly preferable to use polymeric compounds or large cyclic compounds such as phthalocyanine, etc. from the standpoint of heat resistance. Especially, by use of polymeric materials such as polyimides, polyacrylic acids, various fumaric acid copolymers, or various maleic acid copolymers, etc., not only the heat resistance characteristic is excellent but also the film thickness per one layer can be made about 5 Å.

The electrical memory effect of these compounds having a π-electron level has been observed for one having a film thickness of some 10 nm or less, but the thickness should be preferably made 5 Å to 300 Å from the standpoint of film forming property and uniformity.

The tip end of the probe electrode to be used in the present invention is required to be pointed for enhancing the resolving power of recording/reproduction/-erasing. In the present invention, one with the tip end of tungsten with a thickness of 1 mmφ being mechanically polished to a cone of 90° which is then subjected to an electrical field in ultra-high vacuum to vaporize the surface atoms is employed, but the shape of the probe and the treatment method are not limited to these at all.

Further, the number of the probe electrode is not required to be limited to one, but a plural number of probe electrodes may be employed separately for position detection and for recording and reproduction, etc.

Figure 4:
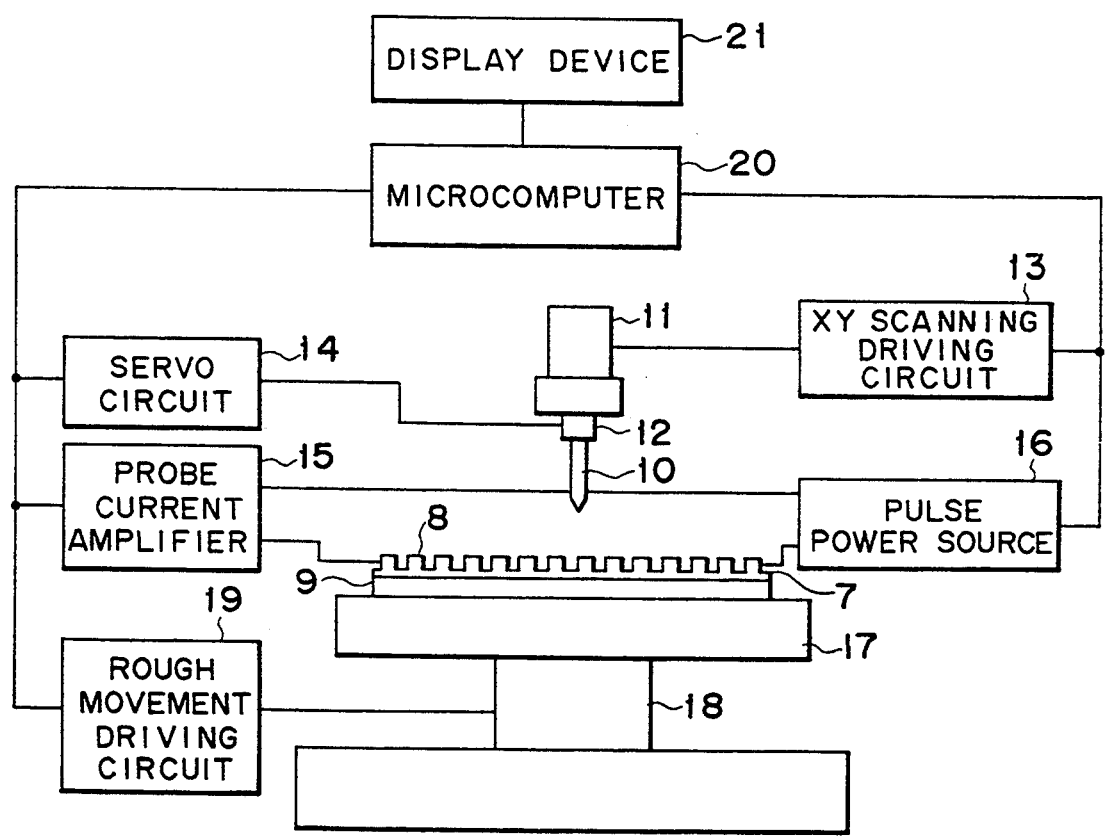
FIG. 4 is a block diagram showing diagrammatically the recording and reproducing device of the present invention.
Figure 5:
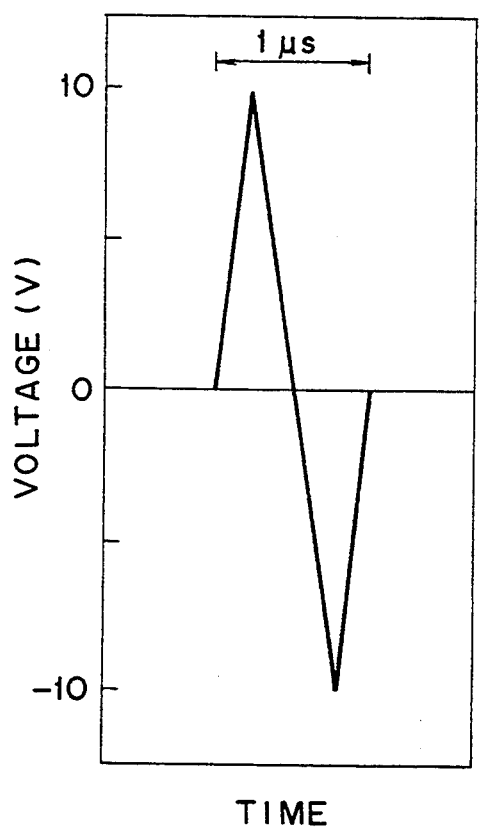
FIG. 5 is a waveform illustration of the pulse voltage applied during recording on the recording medium of the present invention.

Next, a recording and reproducing device using the recording medium of the present invention is described by referring to the block diagram in FIG. 4. In FIG. 4, a probe electrode 10 is used for recording and reproduction, as well as tracking. The recording medium to be used is mounted on the XY stage 17. A probe current amplifier 15 constitutes a bias voltage application circuit for reproduction. A servo circuit 14 control is the XY direction fine movement control mechanism 11 and the Z direction fine movement control mechanism 12 using a piezoelectric element so that the probe current may be constant. A pulse power source 16 applies a pulse voltage for recording and erasing between the probe electrode 10 and the substrate electrode 7.

Because the probe current abruptly changes during application of a pulse voltage, the servo circuit 14 is controlled to set the HOLD circuit ON so that the output voltage during that period may be constant.

A XY scanning driving circuit 13 controls the probe electrode movement in the XY direction. Rough movement mechanism 18 and rough movement driving circuit 19 are used for rough movement control of the distance between the probe electrode 10 and the recording medium so that a probe current of about $10^{-9}$ A may be previously obtained, or for taking a great relative displacement in the XY direction between the probe electrode and the substrate (outside the scope of fine movement control mechanism).

These respective instruments are all under central control by a microcomputer 20. A display device 21 is attached thereto.

Mechanical performances in movement control using a piezoelectric element are shown below.

Z direction fine movement control range: 0.1 nm to 1 μm

Z direction rough movement control range: 10 nm to 10 mm

XY direction scanning range: 0.1 nm to 1 μm

XY direction rough movement control range: 10 nm to 10 mm

Measurement, control tolerance error: <0.1 nm (during fine control)

Measurement, control tolerance error: <1 nm (during fine control)

Having described above an example of the recording and reproducing method when using a probe electrode as the scanning probe, the above method is not limited thereto. Recording also may be performed by use of a probe electrode by applying a pulse voltage corresponding to recording information on the recording medium of the present invention containing a metal layer such as of gold, etc. and changing partially the shape of said metal layer. Also, recording may be effected by making a concave portion by bringing the probe electrode into contact with the recording medium. Also, recording and reproduction may be effected by utilizing the interatomic force between the scanning probe and the recording medium. In this case, during information recording, the method of voltage application onto the recording medium or contact of the probe is required. When there is unevenness corresponding to information provided previously in the recording layer of the recording medium, namely when used exclusively for reproduction, the recording medium is not required to have an electroconductive portion (substrate electrode, etc.) but may be constituted only of a complete insulator. When recording and reproduction are performed using this scanning probe, particularly when its recording density is $10^{10}$ bits or higher, the width and/or the pitch of the track to be used during tracking is required to be sufficiently small, that is, corresponding to the size of a bit, namely at least some 100 Å or less.

In the following examples, the effects of using the recording medium of the present invention, etc. are described in more detail.

EXAMPLE 1

On a Si wafer was successively irradiated an electron beam with a beam diameter of 40 Å, an acceleration voltage of 30 KV, a beam current of $10^{-12}$ A at 150 Å pitch over a length of 100 μm. At this time, the scanning speed was controlled so that the dose of the electron beam was 0.03 to 0.05 C/cm². Next, the substrate 9 subjected to electron beam irradiation 101 was transferred into a vacuum vapor deposition device, wherein ultra-fine particles 102 of gold were vapor deposited to an average film thickness of 50 Å. When the surface shape of the substrate was observed by use of AFM, it was found that a track 1 with a width of about 100 Å and a height of 50 Å was formed at 150 Å pitch.

EXAMPLE 2

After vapor deposition of ultra-fine particles of gold on a Si wafer made in a manner similar to that described in Example 1, gold was vapor deposited to 300 Å thickness by conventional vacuum vapor deposition method to provide a substrate electrode 7. When the substrate equipped with such a substrate electrode was observed by STM, it was found that a track 1 with a width of about 100 Å and a height of 50 Å was formed at 150 Å pitch.

EXAMPLE 3

On a substrate electrode 7 of a substrate equipped with the substrate electrode 9 prepared in entirely the same manner as in Example 2 was formed polyimide LB films of 4 layers to provide a recording layer 8. In the following, the recording layer forming method using polyimide LB films is described.

After the polyamide acid represented by the formula (1) was dissolved in a N,N'-dimethylacetamidebenzene solvent mixture (1:1 V/V) (concentration calculated on monomer: $1 \times 10^{-3}$M), it was mixed with a $1 \times 10^{-3}$M solution of N,N-dimethyloctadecylamine in the same solvent separately prepared to prepare a solution of the polyamide acid octadecylamine salt represented by the formula (2).

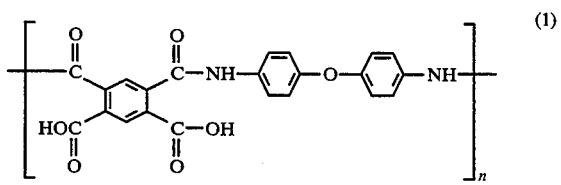

(1)

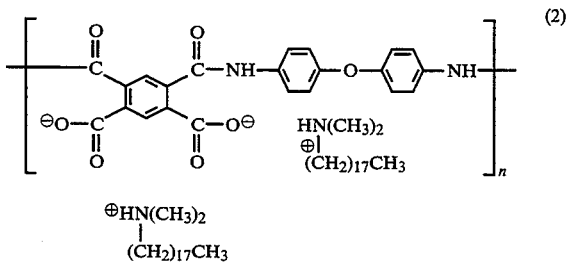

(2)

The solution was spread onto a subphase comprising pure water of a water temperature of 20° C. After evaporation of the solvent, the surface pressure of the spread film was enhanced to 25 mN/m to form a monolayer on the water surface. After the substrate equipped with substrate electrode as described above was gently dipped at a speed of 5 mm/min in the direction crossing the surface while maintaining constantly the surface pressure, it was subsequently drawn up gently at a speed of 5 mm/min to prepare a Y type built-up film of two monolayers. By repeating such operation, a 4-layer built-up film of polyamide acid octadecylamine salt was prepared. Next, the substrate was calcined by heating under reduced pressure (ca. 1 mm Hg) at 300° C. for 10 minutes to imidate the polyamide acid octadecylamine salt (Formula 3) to obtain a 4-layer polyimide built-up film.

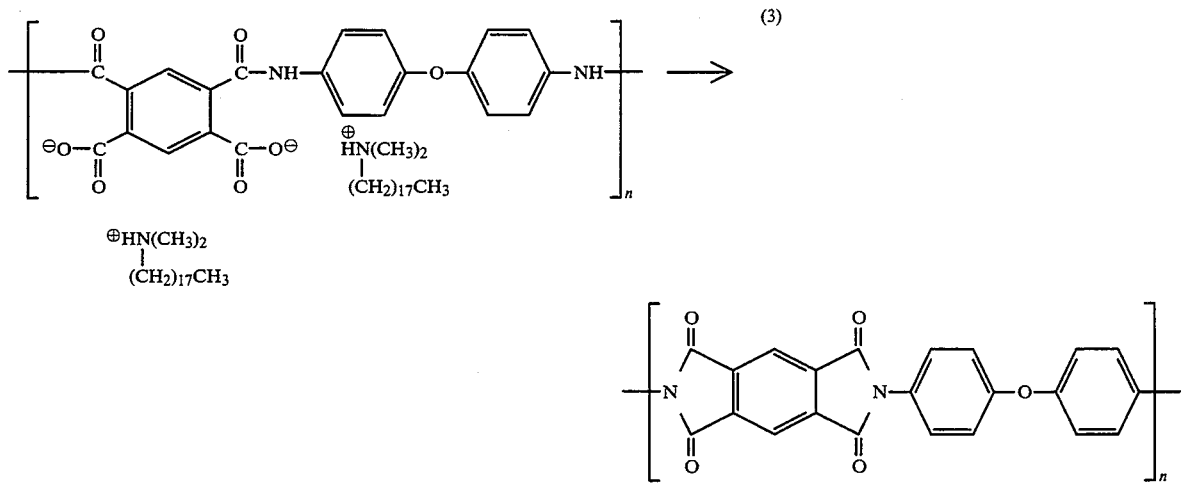

Using the recording medium prepared as described above, experiments of recording and reproduction were carried out. At this time, the recording and reproducing device shown in FIG. 4 was employed. As the probe electrode 10, a probe electrode made of platinum-rhodium (80:20) was employed. The probe electrode 10 is used for controlling the distance (Z) from the surface of the recording layer 8 and the distance (Z) is finely controlled by a piezoelectric element so that the current may be maintained constant. Further, the fine movement control mechanism 11 is designed so that fine movement control also can be effected in the interplanar (X,Y) direction while maintaining the distance Z constant.

Also, the probe electrode 10 can directly perform recording, reproduction and erasing. The recording medium is placed on the XY stage 17 of high precision, and can be moved to any desired position.

The recording medium having the recording layer 8 with 4-layer built-up polyimide as described above was mounted on the XY stage 17. At this time, it was mounted so that the length direction of the track (Y direction in FIG. 1) and the Y direction of the recording and reproducing device may be substantially parallel to each other. Next, a bias voltage of +1.5 V was applied between the probe electrode 10 and the substrate electrode 7 of the recording medium, and the distance (Z) between the probe electrode 10 and the surface of the recording layer 8 was adjusted while monitoring the current. At this time, the probe current Ip for controlling the distance Z between the probe electrode 10 and the surface of the recording layer 8 was set to $10^{-8}$ A $\geq$ Ip $\geq 10^{-10}$ A. Next, while maintaining the probe current constant, the probe electrode 10 was scanned in the X direction, namely the direction crossing the track, and after confirmation that the recording medium surface reflected the shape of the track, the probe electrode 10 was held on a desired track (convexity). Next, while maintaining the probe current constant, the probe electrode was scanned in Y direction. At this time, the position control in the Z direction was required for maintaining the probe current constant, and when the positional displacement of the probe electrode at the time $t+\Delta t$ relative to the position of the probe electrode at a certain time t exceeded $-5$ Å, the displacement amount was controlled within $-5$ Å by scanning the probe electrode in a X or -X direction. As the result, it was found that the probe electrode 10 could be scanned on any desired track without deviating therefrom. At this time, $\Delta t$ was set equal to 1 μs.

Next, recording of information was performed at 50 Å pitch while scanning the probe electrode on the track. Such recording of information was performed with the probe electrode 10 on the + side and the substrate electrode 7 on the − side, and a rectangular pulse voltage of the threshold value voltage $V_{th}$ ON or higher shown in FIG. 4 at which the electrical memory material (polyimide LB film of 4 layers) changes to the low resistance state (ON state) was applied. Then, the probe electrode was returned to the recording initiation point, and again scanned on the track. At this time, the constant current mode was employed during tracking, while during reading of recording, the Z distance was controlled to be constant. As a result, in the recording bit, a probe current of 0.7 mA flowed, thereby indicating the ON state. In the reproduction test as described above, the bit error rate was found to be $2 \times 10^{-6}$.

As a result of tracing again the recording position by setting the probe voltage at 10 V which is above the threshold voltage $V_{th}$ OFF at which the electrical memory material changes from ON state to OFF state, it was also confirmed that all portions of the track in the recorded state were erased, that is transitioned to an OFF state.

EXAMPLE 4

In a method substantially similar to example 1, the pitch of the electron beam irradiation was made 80 Å and the average film thickness of ultra-fine particles of gold was made 30 Å, following otherwise entirely the same procedure as example 1, and a recording medium was prepared. At this time, the width and the height of the track were respectively about 40 Å and 30 Å. When recording and reproducing experiments were conducted using the recording medium in the same manner as in Example 1, the bit error rate was $3 \times 10^{-6}$.

EXAMPLE 5

In a method substantially similar to example 1, vapor deposition of ultra-fine particles of gold was changed to silver, and the recording layer was changed from polyimide to a 4-layer LB film of squarylium-bis-6-octylazulene (hereinafter abbreviated as SOAZ), following otherwise entirely the same procedure as in Example 1, and a recording medium was formed. In the following, the recording layer formation method using SOAZ is described.

First, a solution containing SOAZ dissolved at a concentration of 0.2 mg/ml in benzene was spread onto a subphase comprising pure water of 20° C. After evaporation of the solvent, the surface pressure of the spread film was enhanced to 20 mN/m to form a monolayer on the water surface, and further the above substrate was repeatedly dipped and drawn up at a speed of 3 mm/min in the direction crossing the water surface while maintaining the surface pressure, whereby a built-up film of 4 layers of SOAZ monolayer was formed on the substrate electrode 7.

When the experiments of recording and reproduction were performed using the recording medium prepared as described above, the bit error rate was $3 \times 10^{-6}$.

In the Examples as described above, description has been made using a track having a linear shape, but the shape is not limited thereto. Other forms such as spiral, circular shape, etc. also can be used without any problem at all. Also, as to the preparation method of the recording layer, any film forming method capable of preparing an extremely uniform film may be available, and the method of the present invention is not limited. Also, the present invention is not limited at all with respect to substrate materials. Further, in the present Examples, one probe electrode was employed, but two or more electrodes may be employed separately for recording and reproduction and for tracking, respectively.

As described above, according to the present invention, the following effects can be obtained.

(1) An entirely novel recording medium can be provided, which can perform recording of far greater density than with optical recording of the prior art.

(2) A recording medium equipped with fine tracks with 40 Å to 400 Å width and/or 60 Å to 500 Å pitch and 25 Å to 1000 Å height can be provided easily and with good reproducibility.

(3) By performing tracking using a scanning probe and the above track, a recording medium capable of high density recording and reproduction with extremely good reproducibility can be provided.

We claim:

1. A recording medium, comprising:
   an electrode substrate comprising a substrate provided thereon with a track having a width in the range of 40 Å to 400 Å and a height or depth in the range of 25 Å to 1000 Å at a pitch in the range of 60 Å to 500 Å, and an electrode layer provided on the track having a thickness such that a groove formed in said electrode layer by said track does not embed said track; and
   a recording layer for recording information, said recording layer being provided on said electrode layer and having a thickness such that a groove formed in said recording layer by said track does not embed said track.

2. A recording medium according to claim 1, wherein said recording layer comprises an amorphous semiconductor.

3. A recording medium according to claim 1, wherein said recording layer comprises an organic semiconductor.

4. A recording medium according to claim 1, wherein said recording layer comprises an organic compound including a group having a $\pi$-electron level and a group having only a $\sigma$-electron level.

5. A recording medium according to claim 1, wherein said recording layer comprises a monolayer or built-up monolayers.

6. A recording medium according to claim 1, wherein said recording layer comprises an electroconductive material.

7. A recording medium according to claim 1 having the electrical memory effect.

8. A recording medium according to claim 1, wherein the track comprises ultrafine particles.

9. A recording device, comprising:
   a recording medium including an electrode substrate comprising a substrate provided thereon with a track having a width in the range of 40 Å to 400 Å and a height or depth in the range of 25 Å to 1000 Å at a pitch in the range of 60 Å to 500 Å, and an electrode layer provided on the track having a thickness such that a groove formed in said electrode layer by said track does not embed said track, and a recording layer for recording information, said recording layer being provided on said electrode layer and having a thickness such that a groove formed in said recording layer by said track does not embed said track;
   an electroconductive probe arranged as proximately opposed to said recording medium; and
   means for applying a pulse voltage between said medium and said probe, so that a recording bit may be formed in the recording layer at a track area by flowing electrical current due to application of the pulse voltage.

10. A recording device according to claim 9, wherein a driving means for scanning said probe along said track is provided.

11. A recording device according to claim 9, wherein the recording layer comprises a material selected from
    (a) an amorphous semiconductor,
    (b) an organic semiconductor,
    (c) an organic compound including a group having a pi-electron level and a group having only a sigma-electron level, or
    (d) an electroconductive material.

12. A recording device according to claim 9, wherein the recording layer comprises a monolayer or built-up monolayers.

13. A reproducing device, comprising:
    a recording medium comprising an electrode substrate including a substrate provided thereon with a track having a width in the range of 40 Å to 400 Å and a height or depth in the range of 25 Å to 1000 Å at a pitch in the range of 60 Å to 500 Å, and an electrode layer provided on the track having a thickness such that a groove formed in said electrode layer by said track does not embed said track, and a recording layer provided on said electrode layer and having a thickness such that a groove formed in said recording layer by said track does not embed said track, said medium having a recording bit in the recording layer at a track area;
    an electroconductive probe arranged as proximately opposed to said recording medium; and
    means for applying a voltage between said medium and said probe, so that the recording bit may be read out by detecting electrical current due to application of the voltage.

14. A reproducing device according to claim 13, wherein a driving means for scanning said probe along said track is provided.

15. A reproducing device according to claim 13, wherein the recording layer comprises a material selected from
    (a) an amorphous semiconductor,
    (b) an organic semiconductor,
    (c) an organic compound including a group having a pi-electron level and a group having only a sigma-electron level, or
    (d) an electroconductive material.

16. A reproducing device according to claim 13, wherein the recording layer comprises a monolayer or built-up monolayers.

17. A recording and reproducing device, comprising:
    a recording medium comprising an electrode substrate including a substrate provided thereon with a track having a width in the range of 40 Å to 400 Å and a height or depth in the range of 25 Å to 1000 Å at a pitch in the range of 60 Å to 500 Å, and an electrode layer provided on the track having a thickness such that a groove formed in said electrode layer by said track does not embed said track, and a recording layer for recording information, said recording layer being provided on said electrode layer and having a thickness such that a groove formed in said recording layer by said track does not embed said track;
    an electroconductive probe arranged as proximately opposed to said recording medium;
    means for applying a pulse voltage between said medium and said probe, so that a recording bit may be formed in the recording layer at a track area by flowing electrical current due to application of the pulse voltage, and
    means for applying a voltage between said medium and said probe, so that the recording bit may be read out by detecting electrical current due to application of the voltage.

18. A recording and reproducing device according to claim 17, wherein a driving means for scanning said probe along said track is provided.

19. A recording and reproducing device according to claim 17, wherein the recording layer comprises a material selected from
    (a) an amorphous semiconductor,
    (b) an organic semiconductor,
    (c) an organic compound including a group having a pi-electron level and a group having only a sigma-electron level, or
    (d) an electroconductive material.

20. A recording and reproducing device according to claim 17, wherein the recording layer comprises a monolayer or built-up monolayers.

21. A recording medium, comprising:
    a substrate provided thereon with a track having a width in the range of 40 Å to 400 Å and a height or depth in the range of 25 Å to 1000 Å at a pitch in the range of 60 Å to 500 Å, and
    a recording layer for recording information, said recording layer being provided on said substrate and having a thickness such that a groove formed in said recording layer by said track does not embed said track.

22. A recording medium according to claim 21, wherein the recording layer comprises a material selected from
    (a) an amorphous semiconductor,
    (b) an organic semiconductor,
    (c) an organic compound including a group having a pi-electron level and a group having only a sigma-electron level, or
    (d) an electroconductive material.

23. A recording medium according to claim 21, wherein the recording layer comprises a monolayer or built-up monolayers.

24. A recording medium according to claim 21, wherein the track comprises ultrafine particles.

25. A recording medium according to claim 21, wherein a plurality of tracks are provided on the substrate, and said tracks are electrically connected to one another.

26. A recording device, comprising:
    a recording medium including
        a substrate provided thereon with a track having a width in the range of from 40 Å to 400 Å and a height or depth in the range of 25 Å to 1000 Å at a pitch in the range of 60 Å to 500 Å, and
        a recording layer provided on the track for recording information, the recording layer having a thickness such that a groove formed in said recording layer by said track does not embed said track;
    an electroconductive probe arranged as proximately opposed to said recording medium, and
    means for applying a pulse voltage between said medium and said probe, so that a recording bit may be formed in the recording layer at a track area by flowing electrical current due to application of the pulse voltage.

27. A reproducing device, comprising:
    a recording medium having
        a substrate provided thereon with a track having a width in the range of 40 Å to 400 Å and a height or depth in the range of 25 Å to 1000 Å at a pitch in the range of 60 Å to 500 Å, and
        a recording layer provided on the track for recording information in the form of a recording bit, the recording layer having a thickness such that a groove formed in said recording layer by said track does not embed said track;
    an electroconductive probe arranged as proximately opposed to said recording medium, and
    means for applying a voltage between said recording medium and said probe, so that the recording bit may be read out by detecting electrical current due to application of the voltage.

28. A recording and reproducing device, comprising:
    a recording medium including
        a substrate provided thereon with a track having a width in the range of 40 Å to 400 Å and a height or depth in the range of 25 Å to 1000 Å at a pitch in the range of 60 Å to 500 Å, and
        a recording layer provided on the track for recording information, the recording layer having a thickness such that a groove formed in said recording layer by said track does not embed said track;
    an electroconductive probe arranged as proximately opposed to said recording medium;
    means for applying a pulse voltage between said medium and said probe, so that a recording bit may be formed in the recording layer at a track area by flowing electrical current due to application of the pulse voltage, and
    means for applying a voltage between said medium and said probe, so that the recording bit may be read out by detecting electrical current due to application of the voltage.

* * * * *

UNITED STATES PATENT AND TRADEMARK OFFICE
CERTIFICATE OF CORRECTION

PATENT NO. : 5,396,483　　　　　　　　　　Page 1 of 2
DATED　　　 : March 7, 1995
INVENTOR(S) : HIROSHI MATSUDA, ET AL.

It is certified that error appears in the above-indentified patent and that said Letters Patent is hereby corrected as shown below:

ON THE TITLE PAGE:

At [54] Title

"PROVIDED AND" should read --PROVIDED THEREON, AND--.

At [56] U.S. Patent Documents

"Doumi et al." should read --Ooumi et al.--.

UNITED STATES PATENT AND TRADEMARK OFFICE
CERTIFICATE OF CORRECTION

PATENT NO. : 5,396,483
DATED : March 7, 1995
INVENTOR(S) : HIROSHI MATSUDA, ET AL.

It is certified that error appears in the above-indentified patent and that said Letters Patent is hereby corrected as shown below:

Column 1

Line 3, "PROVIDED AND" should read --PROVIDED THEREON, AND--.
   Line 55, "caused damage" should read --damage caused--.

Column 7

Line 20, "a only" should read --only a--.

Signed and Sealed this

Eleventh Day of July, 1995

Attest:

BRUCE LEHMAN

Attesting Officer          Commissioner of Patents and Trademarks